(12) United States Patent
Chen et al.

(10) Patent No.: US 11,330,530 B2
(45) Date of Patent: May 10, 2022

(54) POWER CONTROL METHOD AND TERMINAL DEVICE

(71) Applicant: GUANGDONG OPPO MOBILE TELECOMMUNICATIONS CORP., LTD., Guangdong (CN)

(72) Inventors: Wenhong Chen, Guangdong (CN); Zhihua Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 53 days.

(21) Appl. No.: 16/919,641

(22) Filed: Jul. 2, 2020

(65) Prior Publication Data
US 2020/0336990 A1 Oct. 22, 2020

Related U.S. Application Data

(63) Continuation of application No. PCT/CN2018/071394, filed on Jan. 4, 2018.

(51) Int. Cl.
*H04W 52/08* (2009.01)
*H04W 52/14* (2009.01)
(Continued)

(52) U.S. Cl.
CPC ......... *H04W 52/146* (2013.01); *H04L 5/0048* (2013.01); *H04L 25/0226* (2013.01);
(Continued)

(58) Field of Classification Search
CPC . H04W 52/146; H04W 52/242; H04W 52/08; H04W 52/10; H04W 52/18;
(Continued)

(56) References Cited

U.S. PATENT DOCUMENTS

2019/0190747 A1* 6/2019 Park .................. H04L 5/005

FOREIGN PATENT DOCUMENTS

CN 101631374 A 1/2010
CN 102075274 A 5/2011
(Continued)

OTHER PUBLICATIONS

International Search Report in the international application No. PCT/CN2018/071394, dated Jul. 3, 2018.
(Continued)

*Primary Examiner* — Tu X Nguyen

(57) ABSTRACT

Embodiments of the present application disclose are a power control method and a terminal apparatus. The method comprises: a terminal apparatus receiving downlink control information (DCI) sent by a network apparatus and used for scheduling a physical uplink shared channel (PUSCH), the DCI comprising a first sounding reference signal (SRS) resource indication; the terminal apparatus determining, according to the DCI, an uplink power control parameter value corresponding to the first SRS resource indication; and the terminal apparatus controlling, according to the uplink power parameter value corresponding to the first SRS resource indication, actual transmit power of first uplink data carried by the PUSCH and corresponding to the first SRS resource indication. The method, the terminal apparatus, and the network apparatus of the embodiments of the present application facilitate an improvement in spectral efficiency.

18 Claims, 3 Drawing Sheets

(51) Int. Cl.
  *H04L 5/00* (2006.01)
  *H04L 25/02* (2006.01)
  *H04W 52/24* (2009.01)
  *H04W 52/36* (2009.01)
  *H04W 72/04* (2009.01)

(52) U.S. Cl.
  CPC ....... *H04W 52/242* (2013.01); *H04W 52/367* (2013.01); *H04W 72/042* (2013.01)

(58) Field of Classification Search
  CPC ..... H04W 52/54; H04W 52/58; H04W 52/00; H04W 52/04; H04W 52/143; H04W 52/32; H04W 52/38; H04W 52/545
  See application file for complete search history.

(56) References Cited

FOREIGN PATENT DOCUMENTS

| | | |
|---|---|---|
| CN | 103312484 A | 9/2013 |
| CN | 110710281 A | 1/2020 |
| JP | 5731018 B2 | 6/2015 |
| JP | 2020510383 A | 4/2020 |
| KR | 20120092651 A | 8/2012 |
| WO | 2011157042 A1 | 12/2011 |
| WO | 2018203728 A1 | 11/2018 |

OTHER PUBLICATIONS

ITL: "UL power control and PHR", 3GPP Draft; R1-1718625 PC, 3rd Generation Partnership Project (3GPP), vol. RAN WG1, no. Prague, CZ; Oct. 9, 2017-Oct. 13, 2017 Oct. 8, 2017 (Oct. 8, 2017), XP051341799,Retrieved from the Internet: URL: http://www.3gpp.org/ftp/Meetings 3GPP SYNC/RAN1/Docs/ [retrieved on Oct. 8, 2017].

ZTE: "Offline summary for AI 7.6 NR UL power control", 3GPP Draft: R1-1718883 Offline Summary for AL7.6 NR UL Power Control ZTE V5, 3rd Generation Partnership Project (3GPP), vol. RAN WG1, no. Prague, Czechia; Oct. 9, 2017-Oct. 13, 2017 Oct. 11, 2017 (Oct. 11, 2017), XP051353367, Retrieved from the Internet: URL: http://www.3gpp.org/ftp/tsg-ran/WG1 RL1/TSGR1 90b/Docs/ [ retrieved on Oct. 11, 2017].

Zte et al: "Discussion on UL power control for NR", 3GPP Draft: R1-1704418 Discussion On UL Power Control for NR, 3rd Generation Partnership Project (3GPP), vol. RAN WG1, no. Spokane, USA Apr. 3, 2017-Apr. 7, 2017 Apr. 2, 2017 (Apr. 2, 2017), XP051242565, Retrieved from the Internet: URL: http:/www.3gpp.org/ftp/Meetings_3GPP SYNC/RAN1/Docs/[retrieved on Apr. 2, 2017].

Supplementary European Search Report in the European application No. 18898270.6, dated Dec. 7, 2020.

Written Opinion of the International Search Authority in the international application No. PCT/CN2018/071394, dated Jul. 3, 2018.

Oppo, On uplink power control for NR, Discussion and Decision, 3GPP TSG RAN WG1 Meeting #90bis R1-1718031, Oct. 9-13, 2017.

First Office Action of the Korean application No. 10-2020-7022434, dated Jun. 24, 2021.

First Office Action of the Indian application No. 202027032953, dated Aug. 2, 2021.

LG Electronics; "Discussion on UL power control for NR",3GPP TSG RAN WG1 Meeting 90bis R1-1717983, Prague, Cz, Oct. 9-13, 2017, Agenda Item: 7.6.1, Document for: Discussion and decision.

Oppo; "On uplink power control for NR", 3GPP TSG RAN WG1 Meeting#91 R1-1719968, Reno, USA, Nov. 27-Dec. 1, 2017, Agenda Item: 7.6.1, Document for: Discussion and Decision.

ZTE, Sanechips; "On NR Power Control Framework", 3GPP TSG RAN WG1 Meeting #91 R1-1719547, Reno, USA, Nov. 27-Dec. 1, 2017, Agenda Item: 7.3.1, Document for: Discussion and Decision.

First Office Action of the Japanese application No. 2020-536938, dated Nov. 19, 2021.

Notice of Allowance of the Korean application No. 10-2020-7022434, dated Dec. 16, 2021.

\* cited by examiner

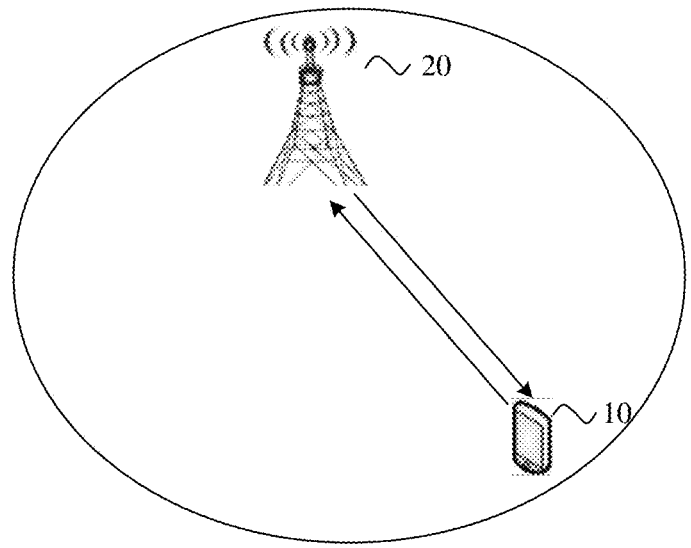

A terminal device receives DCI for scheduling a PUSCH from a network device, the DCI includes a first SRI  ~110

The terminal device determines a value of an uplink power control parameter corresponding to the first SRI according to the DCI  ~120

The terminal device determines an actual transmitting power of first uplink data, corresponding to the first SRI, to be carried in the PUSCH according to the value of the uplink power control parameter corresponding to the first SRI  ~130

FIG. 2

POWER CONTROL METHOD AND TERMINAL DEVICE

CROSS-REFERENCE TO RELATED APPLICATION

The present application is a continuation of International Application No. PCT/CN2018/071394 filed on Jan. 4, 2018, the disclosure of which is hereby incorporated by reference in its entirety.

TECHNICAL FIELD

Embodiments of the application relate to the field of communication, and more particularly to a power control method and a terminal device.

BACKGROUND

In a New Radio (NR) system, multiple panels may be configured for a terminal to perform uplink transmission. A panel includes a group of physical antennae, and each panel may have an independent radio frequency channel. The terminal may simultaneously transmit data via the multiple panels. However, since different panels correspond to different channel conditions, different transmission parameters, for example, transmitting power, are required to be adopted for different panels according to respective channel information. For obtaining these transmission parameters, different Sounding Reference Signal (SRS) resources are required to be configured for different panels. For example, a panel may correspond to an SRS resource set, and a network side may indicate the SRS resource set through an SRS Resource Indicator (SRI). If Downlink Control Information (DCI) is adopted to schedule data transmission on panels, a piece of DCI includes an SRI for a respective panel. In such case, how a terminal device determines transmitting power for uplink transmission corresponding to the SRI is a problem.

SUMMARY

In view of this, the embodiments of the application provide a power control method, a terminal device and a network device, which are favorable for achieving higher spectrum efficiency.

A first aspect provides a power control method, which may include the following operations: a terminal device receives DCI for scheduling a Physical Uplink Shared Channel (PUSCH) from a network device, the DCI includes a first SRI; the terminal device determines a value of an uplink power control parameter corresponding to the first SRI according to the DCI; and the terminal device determines actual transmitting power of first uplink data, corresponding to the first SRI, to be carried in the PUSCH according to the value of the uplink power control parameter corresponding to the first SRI.

A second aspect provides a terminal device, which is configured to execute the method in the first aspect or any possible implementation mode of the first aspect. Specifically, the terminal device includes units configured to execute the method in the first aspect or any possible implementation mode of the first aspect.

These aspects or other aspects of the application will become clearer and easier to understand through the following descriptions about the embodiments.

BRIEF DESCRIPTION OF THE DRAWINGS

FIG. 1 is a schematic diagram of an application scenario according to an embodiment of the application.

FIG. 2 is a schematic block diagram of an uplink power control method according to an embodiment of the application.

DETAILED DESCRIPTION

Figure 3:
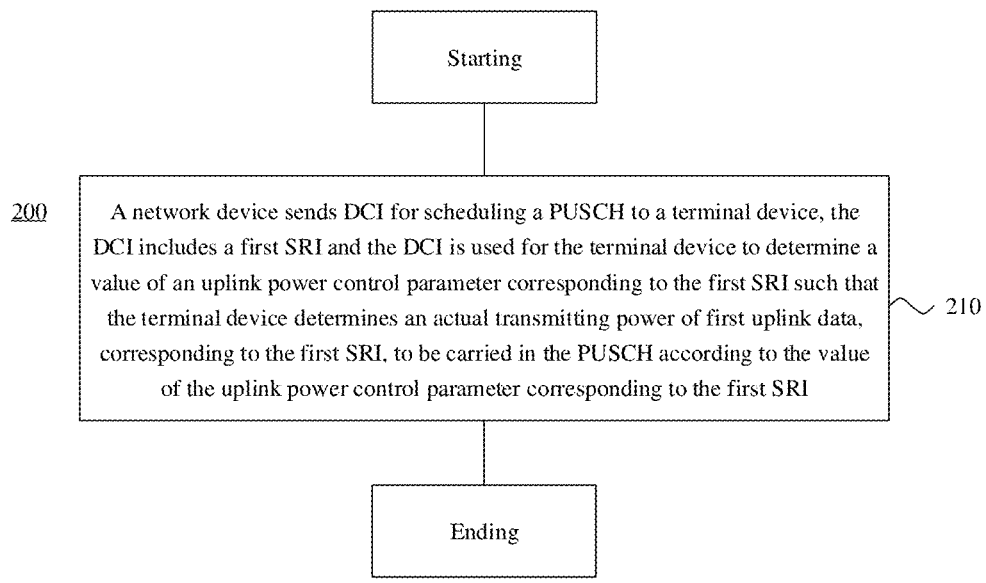
FIG. 3 is another schematic block diagram of an uplink power control method according to an embodiment of the application.

The technical solutions in the embodiments of the application will be clearly and completely described below in combination with the drawings in the embodiments of the application.

It is to be understood that the technical solutions of the embodiments of the application may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system, an NR or future 5th-Generation (5G) system.

Particularly, the technical solutions of the embodiments of the application may be applied to various nonorthogonal multiple access technology-based communication systems, for example, a Sparse Code Multiple Access (SCMA) system and a Low Density Signature (LDS) system, and of course, the SCMA system and the LDS system may also have other names in the field of communication. Furthermore, the technical solutions of the embodiments of the application may be applied to multi-carrier transmission systems adopting nonorthogonal multiple access technologies, for example, Orthogonal Frequency Division Multiplexing (OFDM), Filter Bank Multi-Carrier (FBMC), Generalized Frequency Division Multiplexing (GFDM) and Filtered-OFDM (F-OFDM) systems adopting the nonorthogonal multiple access technologies.

In the embodiments of the application, a terminal device may refer to User Equipment (UE), an access terminal, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle device, a wearable device, a terminal device in a future 5G network, a terminal device in a future evolved Public Land Mobile Network (PLMN) or the like. There are no limits made in the embodiments of the application.

In the embodiments of the application, a network device may be a device configured to communicate with the terminal device. The network device may be a Base Transceiver Station (BTS) in the GSM or the CDMA, may also be a NodeB (NB) in the WCDMA system, may also be an Evolutional Node B (eNB or eNodeB) in the LTE system and may further be a wireless controller in a Cloud Radio Access Network (CRAN) scenario. Or the network device may be a relay station, an access point, a vehicle device, a wearable device, a network device in the future 5G network, a network device in the future evolved PLMN or the like. There are no limits made in the embodiments of the application.

FIG. 1 is a schematic diagram of an application scenario according to an embodiment of the application. A communication system in FIG. 1 may include a terminal device 10 and a network device 20. The network device 20 is configured to provide communication service for the terminal device 10 and access to a core network. The terminal device 10 accesses to the network by searching a synchronous signal, broadcast signal and the like transmitted by the network device 20, thereby communicating with the network. Arrows shown in FIG. 1 may represent uplink/downlink transmission implemented through a cellular link between the terminal device 10 and the network device 20.

In an NR system, multiple panels may be configured for a terminal to perform uplink transmission. A panel includes a group of physical antennae, and each panel may have an independent radio frequency channel. The terminal may simultaneously transmit data on the multiple panels. However, since different panels correspond to different channel conditions, different transmission parameters, for example, transmitting power, are required to be adopted for different panels according to respective channel information. For obtaining these transmission parameters, different SRS resources are required to be configured for different panels. For example, a panel may correspond to an SRS resource set, and a network side may indicate the SRS resource set through an SRI. The terminal may obtain a power control parameter corresponding to uplink transmission according to the SRI or an SRS resource indicated by the SRI, thereby obtaining transmitting power for transmission of uplink data.

At present, transmitting power of a PUSCH may be calculated through the following formula:

$$P_{PUSCH,c}(i) = \min \left\{ \begin{array}{l} P_{CMAX,c}(i) \\ 10\log_{10}(M_{PUSCH,c}(i)) + P_{O\_PUSCH,c}(j) + \alpha_c(j) \cdot PL_c + \Delta_{TF,c}(i) + f_c(i, l) \end{array} \right\}$$

where i is an index of a PUSCH transmission, j is an index of an open-loop power control parameter, k is an index of a Reference Signal (RS) resource for path loss estimation, $M_{PUSCH,c}(i)$ is the number of Resource Blocks (RBs) occupied by the PUSCH, $P_{CMAX,c}(i)$ is maximum transmitting power, configured by a terminal device, of a subframe i in a serving cell c, $P_{O\_PUSCH,c}(j)$ and $\alpha_c(j)$ are open-loop power control parameters and have values determined by the terminal device through high-layer signaling, $PL_c$ is a path loss value, measured by the terminal device, from the serving cell c to the terminal device, $\Delta_{TF,c}(i)$ is a value determined by the terminal device according to a ratio of the bit number of uplink data transmitted by the PUSCH and the number of resource units in the PUSCH, and $f_c(i,l)$ is a closed-loop power control regulation factor and has a value determined by the terminal device according to a power regulation command for the PUSCH.

FIG. 2 is a schematic block diagram of a power control method 100 according to an embodiment of the application. As shown in FIG. 2, the method 100 includes the following steps.

In S110, a terminal device receives DCI for scheduling a PUSCH from a network device, the DCI includes a first SRI.

In S120, the terminal device determines a value of an uplink power control parameter corresponding to the first SRI according to the DCI.

In S130, the terminal device determines actual transmitting power of first uplink data, corresponding to the first SRI, to be carried in the PUSCH according to the value of the uplink power control parameter corresponding to the first SRI.

Optionally, the DCI may further include a second SRI, and the first SRI and the second SRI correspond to independent values of the uplink power control parameter respectively.

Specifically, the network device may pre-configure the values of the uplink power control parameters corresponding to the first SRI and the second SRI respectively for the terminal device. For example, the network device may pre-configure a mapping relationship between a value of an SRI and a value of the uplink power control parameter, and the network device may contain the first SRI and the second SRI in the DCI for scheduling the PUSCH, so that the terminal device can determine the value of the uplink power control parameter corresponding to each SRI according to the DCI and further determine actual transmitting power of uplink data corresponding to each SRI. For example, based on the abovementioned formula, the network device may pre-configure a value of {j, k, l} corresponding to each SRI through high-layer signaling. Different values of the uplink power control parameter may be obtained according to different values. Therefore, each SRI may correspond to a set of values of the uplink power control parameter.

Therefore, the power control method of the embodiment of the application is favorable for achieving higher spectrum efficiency.

Optionally, before the operation that the terminal device receives the DCI, the method further includes the following operations: the terminal device receives first configuration information transmitted by the network device, the first configuration information indicates a mapping relationship between a value of the first SRI and a value of the uplink power control parameter; and the operation that the terminal device determines the value of the uplink power control parameter corresponding to the first SRI according to the DCI may include the following operations: the terminal device determines the value of the uplink power control parameter corresponding to the first SRI according to a value of the first SRI in the DCI and the mapping relationship.

Optionally, before the operation that the terminal device receives the DCI transmitted by the network device, the method further includes the following operations: the terminal device receives second configuration information transmitted by the network device, the second configuration information indicates a value of the uplink power control parameter corresponding to a value of the second SRI and the value of the uplink power control parameter corresponding to the value of the second SRI and the value of the uplink power control parameter corresponding to the value of the first SRI are independently configured by the network device.

That is, the network device may pre-configure the mapping relationship between the value of the SRI and the value of the uplink power control parameter for the terminal device and indicate it to the terminal device through high-layer signaling such as Radio Resource Control (RRC). Or the mapping relationship may also be predetermined in a protocol. It is to be understood that the mapping relationship may be a direct mapping relationship between the values of the SRI and the uplink power control parameter and may also be an indirect mapping relationship. For example, the mapping relationship may also be mapping between the number of SRS resources indicated by the SRI and the value of the uplink power control parameter. There are no limits made thereto in the embodiment of the application.

Optionally, the first SRI and the second SRI may also correspond to independent candidate values of the uplink power control parameter. For example, each of the first SRI and the second SRI includes 2 bits, and may correspond to four possible values of the uplink power control parameter respectively. The first SRI and the second SRI may be independently configured by a network side, may be configured into different values and may also be configured into the same value.

Optionally, the uplink power control parameter includes a path loss value for determination of the transmitting power of the uplink data or information about a downlink signal for measuring the path loss value.

The downlink signal may be a downlink Synchronous Signal Block (SSB) and may also be a Channel State Information-Reference Signal (CSI-RS). The information about the downlink signal may be an index of a target downlink RS for measuring the path loss value in multiple downlink RSs pre-configured by the network side, for example, k in the abovementioned formula. That is, the terminal device may determine an index k of a downlink signal according to the value of the first SRI and perform downlink path loss measurement based on the downlink signal indicated by the index k, thereby obtaining the path loss value.

Optionally, the uplink power control parameter includes at least one of an open-loop power control parameter or a closed-loop power control parameter.

Specifically, a value of the open-loop power control parameter may be indication information of the target power Po, may also be indication information of a path loss factor a and may also be indication information of a closed-loop power regulation function f(i). For example, a value of the open-loop power control parameter may be an index of a value, for example, j in the formula, in multiple pieces of target power Po pre-configured by the network side, may also be an index of a value, for example, k in the formula, in multiple path loss factors a pre-configured by the network device and may also be a closed-loop power control process index, for example, l in the formula.

Optionally, the operation that the terminal device determines the value of the uplink power control parameter corresponding to the first SRI according to the DCI includes the following operations: the terminal device determines a value of a maximum transmitting power corresponding to the first SRI according to the DCI; and the operation that the terminal device determines the actual transmitting power of the first uplink data, corresponding to the first SRI, to be carried in the PUSCH according to the value of the uplink power control parameter includes the following operations: the terminal device determines the actual transmitting power of the first uplink data according to the value of the maximum transmitting power corresponding to the first SRI.

The terminal device may determine a value of a maximum transmitting power corresponding to each SRI in the DCI according to the DCI and then may determine actual transmitting power of uplink data corresponding to each SRI according to the value of the maximum transmitting power corresponding to each SRI and the calculation formula for uplink transmitting power.

Optionally, the operation that the terminal device determines the value of the maximum transmitting power corresponding to the first SRI according to the DCI includes the following operations: the terminal device determines the value of the maximum transmitting power corresponding to the first SRI according to the number of SRIs in the DCI. For example, if the DCI includes N SRIs, maximum transmitting power for uplink data transmission corresponding to each SRI (including the first SRI) is $P_{c,max}/N$, where $P_{c,max}$ is total maximum transmitting power supported by the terminal.

Optionally, the operation that the terminal device determines the value of the maximum transmitting power corresponding to the first SRI according to the DCI includes the following operations: the terminal device determines the value of the maximum transmitting power corresponding to the first SRI according to the number of SRS resources indicated by the first SRI in the DCI. For example, if the SRI indicates M SRS resources and the total number of SRS resources indicated by all the SRIs in the DCI is N, the maximum transmitting power for uplink data transmission corresponding to the SRI is $M*P_{c,max}/N$, where $P_{c,max}$ is the total maximum transmitting power supported by the terminal. For another example, if the first SRI indicates only one SRS resource (it is indicated that respective uplink data transmission is implemented on only one panel), the maximum transmitting power for uplink data transmission corresponding to the first SRI is $P_{c,max}/2$; and if the first SRI indicates more than one SRS resource, the maximum transmitting power for uplink data transmission corresponding to the first SRI $P_{c,max}$, where $P_{c,max}$ is the total maximum transmitting power supported by the terminal. Herein, there is made such a hypothesis that the terminal supports at most panels and transmission of multiple layers is implemented on multiple panels respectively.

Optionally, the operation that the terminal device determines the actual transmitting power of the first uplink data, corresponding to the first SRI, to be carried in the PUSCH according to the value of the uplink power control parameter corresponding to the first SRI includes the following operations: the terminal device determines initial transmitting power of the first uplink data according to the value of the uplink power control parameter corresponding to the first SRI; and the terminal device determines the actual transmitting power of the first uplink data according to the initial transmitting power of the first uplink data, total initial transmitting power of uplink data to be carried in the PUSCH and maximum uplink transmitting power of the terminal device.

Specifically, the terminal determines initial transmitting power $P_n$ for uplink data transmission corresponding to each SRI in the DCI and calculates the total transmitting power $$P_a = \sum_{n=1}^{N} P_n$$

for all uplink data transmission in the PUSCH scheduled by the DCI (namely the initial transmitting power for all data transmission is summed). If the total transmitting power is less than or equal to the maximum uplink transmitting power, the initial transmitting power is the actual transmitting power. If the total transmitting power is higher than the maximum uplink transmitting power, it is necessary to regulate the initial transmitting power according to a proportional relationship between the total transmitting power and the maximum uplink transmitting power to obtain the actual transmitting power. For example, the regulated actual transmitting power may be represented as $P_{n,c}=P_n*P_{c,max}/P_{c}$, where $P_{c,max}$ is the total maximum transmitting power supported by the terminal.

Optionally, the first uplink data is part of data to be carried in the PUSCH.

Specifically, the DCI may schedule uplink data transmission including N transmission layers, and the uplink data is data of M transmission layers in the N transmission layers. Herein, N is an integer greater than 0 and M is an integer less than N and greater than 0. Typically, M=1. If the uplink data is part of data to be carried in the PUSCH scheduled by the DCI, for example, part of multiple data transmission layers to be carried in the PUSCH, the terminal is required to determine the corresponding SRI for each part of data to be transmitted to control power of the data. For example, if the PUSCH carries data transmission of two layers, an SRI may be indicated for data of each layer; and if the PUSCH carries data transmission of four layers, an SRI may be indicated for data of every two layers. If the uplink data is part of data to be carried in the PUSCH scheduled by the DCI, for example, part of the multiple data transmission layers to be carried in the PUSCH, the terminal is required to determine a respective actual transmitting power for each data transmission layer according to the solution provided in the application.

Optionally, the method further includes the operation that the terminal device transmits the first uplink data to the network device according to the actual transmitting power.

Of course, the actual transmitting power calculated by the terminal is not always adopted to actually transmit the uplink data and may also be adopted to calculate a Power Headroom Report (PHR) of the present PUSCH for reporting to the network side or configured to calculate transmitting power of another uplink signal as a reference. For example, the terminal may obtain transmitting power of an SRS according to the calculated actual transmitting power of the uplink data adding a certain offset value, and in such case, there may not be uplink data transmission actually.

FIG. 3 is a schematic block diagram of a power control method 200 according to an embodiment of the application. As shown in FIG. 3, the method 200 includes part or all of the following contents.

In S210, a network device transmits DCI for scheduling a PUSCH to a terminal device, the DCI includes a first SRI and the DCI is used for the terminal device to determine a value of an uplink power control parameter corresponding to the first SRI such that the terminal device determines actual transmitting power of first uplink data, corresponding to the first SRI, to be carried in the PUSCH according to the value of the uplink power control parameter corresponding to the first SRI.

Therefore, the power control method of the embodiment of the application is favorable for achieving higher spectrum efficiency.

Optionally, in the embodiment of the application, before the operation that the network device transmits the DCI to the terminal device, the method further includes an operation that the network device transmits first configuration information to the terminal device, the first configuration information indicates a mapping relationship between a value of the first SRI and a value of the uplink power control parameter.

Optionally, in the embodiment of the application, before the operation that the network device transmits the DCI to the terminal device, the method further includes an operation that the network device transmits second configuration information to the terminal device, the second configuration information indicates a value of the uplink power control parameter corresponding to a value of a second SRI and the value of the uplink power control parameter corresponding to the value of the second SRI and the value of the uplink power control parameter corresponding to the value of the first SRI are independently configured by the network device.

Optionally, in the embodiment of the application, the uplink power control parameter includes a path loss value for determination of the transmitting power of the uplink data or information about a downlink signal for measuring the path loss value.

Optionally, in the embodiment of the application, the uplink power control parameter includes at least one of an open-loop power control parameter or a closed-loop power control parameter.

Optionally, in the embodiment of the application, the first uplink data is part of data to be carried in the PUSCH.

Optionally, in the embodiment of the application, the method further includes an operation that the network device receives the first uplink data transmitted by the terminal device based on the actual transmitting power.

It is to be understood that terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

It is to be understood that interaction between the network device and the terminal device and related properties, functions and the like described from the network device correspond to related properties and functions of the terminal device. Moreover, the related contents have been described in detail in the method 100 and, for simplicity, will not be elaborated herein.

It is also to be understood that, in each embodiment of the application, a magnitude of a sequence number of each process does not mean an execution sequence and the execution sequence of each process should be determined by its function and an internal logic and should not form any limit to an implementation process of the embodiments of the application.

The power control method according to the embodiments of the application is described above in detail and a power control device according to the embodiments of the application will be described below in combination with FIG. 4 to FIG. 7. The technical characteristics described in the method embodiments are applied to the following device embodiments.

Figure 4:
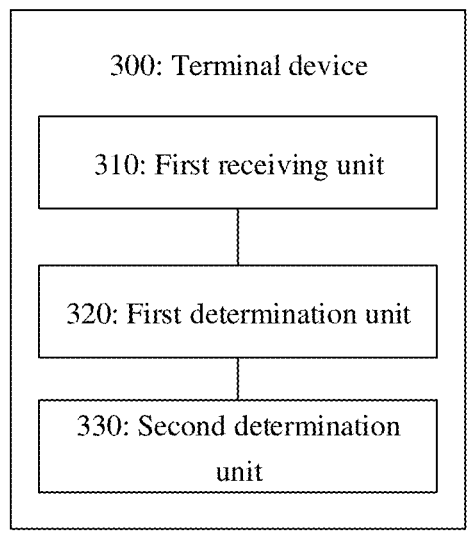
FIG. 4 is a schematic block diagram of a terminal device according to an embodiment of the application.

FIG. 4 is a schematic block diagram of a terminal device 300 according to an embodiment of the application. As shown in FIG. 4, the terminal device 300 includes a first receiving unit 310, a first determination unit 320 and a second determination unit 330.

The first receiving unit 310 is configured to receive DCI for scheduling a PUSCH from a network device, the DCI includes a first SRI.

The first determination unit 320 is configured to determine a value of an uplink power control parameter corresponding to the first SRI according to the DCI.

The second determination unit 330 is configured to determine an actual transmitting power of first uplink data, corresponding to the first SRI, to be carried in the PUSCH according to the value of the uplink power control parameter corresponding to the first SRI.

Therefore, the terminal device of the embodiment of the application is favorable for achieving higher spectrum efficiency.

Optionally, in the embodiment of the application, the terminal device further includes a second receiving unit, configured to, before the first receiving unit receives the DCI, receive first configuration information transmitted by the network device, the first configuration information indicates a mapping relationship between a value of the first SRI and a value of the uplink power control parameter.

The first determination unit is specifically configured to determine the value of the uplink power control parameter corresponding to the first SRI according to a value of the first SRI in the DCI and the mapping relationship.

Optionally, in the embodiment of the application, the first determination unit is specifically configured to determine a value of a maximum transmitting power corresponding to the first SRI according to the DCI.

The second determination unit is specifically configured to determine the actual transmitting power of the first uplink data according to the value of the maximum transmitting power corresponding to the first SRI.

Optionally, in the embodiment of the application, the first determination unit is specifically configured to determine the value of the maximum transmitting power corresponding to the first SRI according to the number of SRIs in the DCI.

Optionally, in the embodiment of the application, the first determination unit is specifically configured to determine the value of the maximum transmitting power corresponding to the first SRI according to the number of SRS resources indicated by the first SRI in the DCI.

Optionally, in the embodiment of the application, the second determination unit is specifically configured to determine initial transmitting power of the first uplink data according to the value of the uplink power control parameter corresponding to the first SRI and determine the actual transmitting power of the first uplink data according to the initial transmitting power of the first uplink data, total initial transmitting power of uplink data to be carried in the PUSCH and maximum uplink transmitting power of the terminal device.

Optionally, in the embodiment of the application, the DCI further includes a second SRI, and the first SRI and the second SRI correspond to independent values of the uplink power control parameter respectively.

Optionally, in the embodiment of the application, the terminal device further includes a third receiving unit, configured to, before the first receiving unit receives the DCI, receive second configuration information transmitted by the network device, the second configuration information indicates a value of the uplink power control parameter corresponding to a value of the second SRI and the value of the uplink power control parameter corresponding to the value of the second SRI and the value of the uplink power control parameter corresponding to the value of the first SRI are independently configured by the network device.

Optionally, in the embodiment of the application, the uplink power control parameter includes a path loss value for determination of the transmitting power of the uplink data or information about a downlink signal for measuring the path loss value.

Optionally, in the embodiment of the application, the uplink power control parameter includes at least one of an open-loop power control parameter or a closed-loop power control parameter.

Optionally, in the embodiment of the application, the first uplink data is part of data to be carried in the PUSCH.

Optionally, in the embodiment of the application, the terminal device further includes a transmitting unit, configured to transmit the first uplink data to the network device according to the actual transmitting power.

It is to be understood that the terminal device 300 according to the embodiment of the application may correspond to the terminal device in the method embodiment of the application and the abovementioned and other operations and/or functions of each unit in the terminal device 300 are adopted to implement the corresponding flows executed by the terminal device in the method in FIG. 2 respectively and will not be elaborated herein for simplicity.

Figure 5:
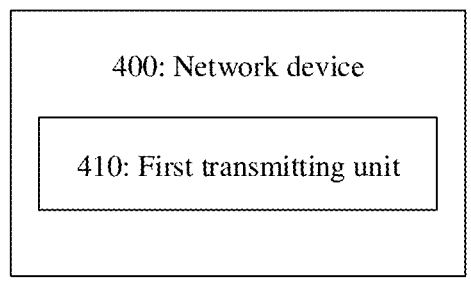
FIG. 5 is a schematic block diagram of a network device according to an embodiment of the application.

FIG. 5 is a schematic block diagram of a network device 400 according to an embodiment of the application. As shown in FIG. 5, the network device 400 includes a first transmitting unit 410.

The first transmitting unit 410 is configured to transmit DCI for scheduling a PUSCH to a terminal device, the DCI includes a first SRI and the DCI is used for the terminal device to determine a value of an uplink power control parameter corresponding to the first SRI such that the terminal device determines actual transmitting power of first uplink data, corresponding to the first SRI, to be carried in the PUSCH according to the value of the uplink power control parameter corresponding to the first SRI.

Therefore, the network device of the embodiment of the application is favorable for achieving higher spectrum efficiency.

Optionally, in the embodiment of the application, the network device further includes a second transmitting unit, configured to, before the first transmitting unit transmits the DCI, transmit first configuration information to the terminal device, the first configuration information indicates a mapping relationship between a value of the first SRI and a value of the uplink power control parameter.

Optionally, in the embodiment of the application, the DCI further includes a second SRI, and the first SRI and the second SRI correspond to independent values of the uplink power control parameter respectively.

Optionally, in the embodiment of the application, the network device further includes a third transmitting unit, configured to, before the first transmitting unit transmits the DCI, transmit second configuration information to the terminal device, the second configuration information indicates a value of the uplink power control parameter corresponding to a value of the second SRI and the value of the uplink power control parameter corresponding to the value of the second SRI and the value of the uplink power control parameter corresponding to the value of the first SRI are independently configured by the network device.

Optionally, in the embodiment of the application, the uplink power control parameter includes a path loss value for determination of the transmitting power of the uplink data or information about a downlink signal for measuring the path loss value.

Optionally, in the embodiment of the application, the uplink power control parameter includes at least one of an open-loop power control parameter or a closed-loop power control parameter.

Optionally, in the embodiment of the application, the first uplink data is part of data to be carried in the PUSCH.

Optionally, in the embodiment of the application, the network device further includes a receiving unit, configured to receive the first uplink data transmitted by the terminal device based on the actual transmitting power.

It is to be understood that the network device 400 according to the embodiment of the application may correspond to the network device in the method embodiment of the application and the abovementioned and other operations and/or functions of each unit in the network device 400 are adopted to implement the corresponding flows executed by the network device in the method in FIG. 3 respectively and will not be elaborated herein for simplicity.

Figure 6:
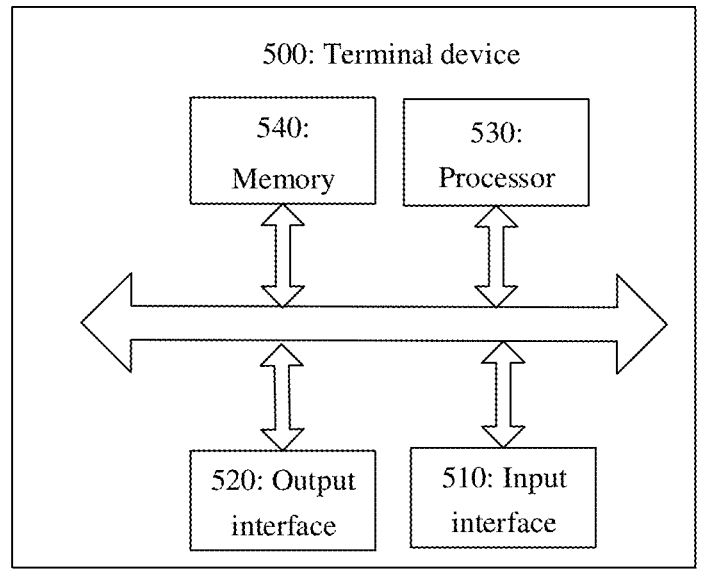
FIG. 6 is another schematic block diagram of a terminal device according to an embodiment of the application.

As shown in FIG. 6, an embodiment of the application also provides a terminal device 500. The terminal device 500 may be the terminal device 300 in FIG. 4, and may be configured to execute contents of the terminal device corresponding to the method 100 in FIG. 2. The terminal device 500 includes an input interface 510, an output interface 520, a processor 530 and a memory 540. The input interface 510, the output interface 520, the processor 530 and the memory 540 may be connected through a bus system. The memory 540 is configured to store a program, an instruction or a code. The processor 530 is configured to execute the program instruction or code in the memory 540 to control the input interface 510 to receive a signal, control the output interface 520 to transmit a signal and complete operations in the method embodiment.

Therefore, the terminal device of the embodiment of the application is favorable for achieving higher spectrum efficiency.

It is to be understood that, in the embodiment of the application, the processor 530 may be a Central Processing Unit (CPU), and the processor 530 may also be another universal processor, a Digital Signal Processor (DSP), an Application Specific Integrated Circuit (ASIC), a Field Programmable Gate Array (FPGA) or another programmable logic device, discrete gate or transistor logic device and discrete hardware component and the like. The universal processor may be a microprocessor or the processor may also be any conventional processor and the like.

The memory 540 may include a Read-Only Memory (ROM) and a Random Access Memory (RAM) and provides an instruction and data for the processor 530. A part of the memory 540 may further include a nonvolatile RAM. For example, the memory 540 may further store information of a device type.

In an implementation process, each content of the method may be completed by an integrated logic circuit of hardware in the processor 530 or an instruction in a software form. The contents of the method disclosed in combination with the embodiments of the application may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 540. The processor 530 reads information in the memory 540 and completes the contents of the method in combination with hardware. Detailed descriptions are omitted herein to avoid repetitions.

In a specific implementation mode, the first determination unit and second determination unit in the terminal device 300 may be implemented by the processor 530 in FIG. 6, the transmitting unit of the terminal device 300 may be implemented by the output interface 520 in FIG. 6, and the first receiving unit, second receiving unit and third receiving unit of the terminal device 300 may be implemented by the input interface 510 in FIG. 6.

Figure 7:
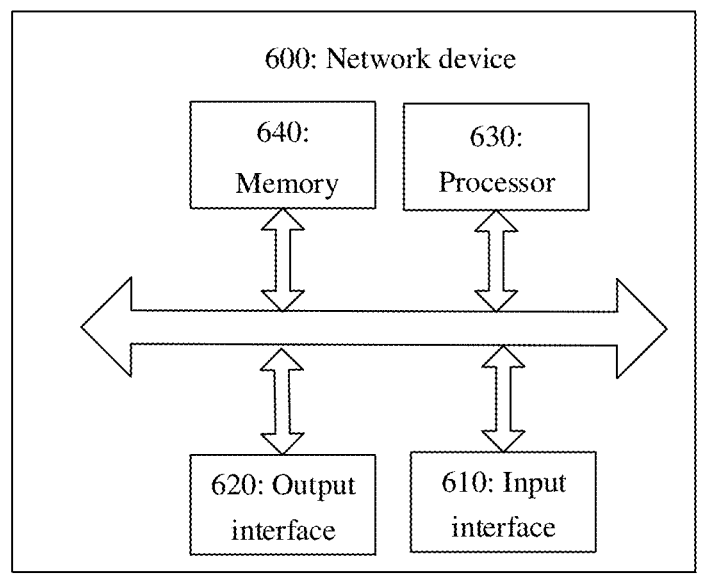
FIG. 7 is another schematic block diagram of a network device according to an embodiment of the application.

As shown in FIG. 7, an embodiment of the application also provides a network device 600. The network device 600 may be the network device 400 in FIG. 5, and may be configured to execute contents of the network device corresponding to the method 200 in FIG. 3. The network device 600 includes an input interface 610, an output interface 620, a processor 630 and a memory 640. The input interface 610, the output interface 620, the processor 630 and the memory 640 may be connected through a bus system. The memory 640 is configured to store a program, an instruction or a code. The processor 630 is configured to execute the program instruction or code in the memory 640 to control the input interface 610 to receive a signal, control the output interface 620 to transmit a signal and complete operations in the method embodiment.

Therefore, the network device of the embodiment of the application is favorable for achieving higher spectrum efficiency.

It is to be understood that, in the embodiment of the application, the processor 630 may be a CPU, and the processor 630 may also be another universal processor, a DSP, an ASIC, an FPGA or another programmable logic device, discrete gate or transistor logic device and discrete hardware component and the like. The universal processor may be a microprocessor or the processor may also be any conventional processor and the like.

The memory 640 may include a ROM and a RAM and provides an instruction and data for the processor 630. A part of the memory 640 may further include a nonvolatile RAM. For example, the memory 640 may further store information of a device type.

In an implementation process, each content of the method may be completed by an integrated logic circuit of hardware in the processor 630 or an instruction in a software form. The contents of the method disclosed in combination with the embodiments of the application may be directly embodied to be executed and completed by a hardware processor or executed and completed by a combination of hardware and software modules in the processor. The software module may be located in a mature storage medium in this field such as a RAM, a flash memory, a ROM, a programmable ROM or electrically erasable programmable ROM and a register. The storage medium is located in the memory 640. The processor 630 reads information in the memory 640 and completes the contents of the method in combination with hardware. Detailed descriptions are omitted herein to avoid repetitions.

In a specific implementation mode, the first transmitting unit, second transmitting unit and third transmitting unit in the network device 400 may be implemented by the output interface 620 in FIG. 7, and the receiving unit in the network device 400 may be implemented by the input interface 610 in FIG. 7.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the application may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of each embodiment of the application. The storage medium includes: various media capable of storing program codes such as a U disk, a mobile hard disk, a ROM, a RAM, a magnetic disk or an optical disk.

The above is only the specific implementation mode of the application and not intended to limit the scope of protection of the application. Any variations or replacements apparent to those skilled in the art within the technical scope disclosed by the application shall fall within the scope of protection of the application. Therefore, the scope of protection of the application shall be subject to the scope of protection of the claims.

The invention claimed is:

1. A method of power control, comprising:
receiving, by a terminal device, Downlink Control Information (DCI) for scheduling a Physical Uplink Shared Channel (PUSCH) from a network device, the DCI comprising a first Sounding Reference Signal (SRS) Resource Indicator (SRI);
determining, by the terminal device according to the DCI, a value of an uplink power control parameter corresponding to the first SRI;
determining, by the terminal device, initial transmitting power of first uplink data according to the value of the uplink power control parameter corresponding to the first SRI; and
determining, by the terminal device, an actual transmitting power of the first uplink data, according to the initial transmitting power of the first uplink data, total initial transmitting power of uplink data to be carried in the PUSCH and maximum uplink transmitting power of the terminal device.

2. The method of claim 1, further comprising: before receiving, by the terminal device, the DCI,
receiving, by the terminal device, first configuration information transmitted by the network device, the first configuration information indicating a mapping relationship between a value of the first SRI and a value of the uplink power control parameter, wherein
determining, by the terminal device according to the DCI, the value of the uplink power control parameter corresponding to the first SRI comprises:
determining, by the terminal device according to a value of the first SRI in the DCI and the mapping relationship, the value of the uplink power control parameter corresponding to the first SRI.

3. The method of claim 1, wherein determining, by the terminal device according to the DCI, the value of the uplink power control parameter corresponding to the first SRI comprises:
determining, by the terminal device according to the DCI, a value of a maximum transmitting power corresponding to the first SRI.

4. The method of claim 3, wherein determining, by the terminal device according to the DCI, the value of the maximum transmitting power corresponding to the first SRI comprises:
determining, by the terminal device, the value of the maximum transmitting power corresponding to the first SRI according to a number of SRIs in the DCI.

5. The method of claim 3, wherein determining, by the terminal device according to the DCI, the value of the maximum transmitting power corresponding to the first SRI comprises:
determining, by the terminal device, the value of the maximum transmitting power corresponding to the first SRI according to a number of SRS resources indicated by the first SRI in the DCI.

6. The method of claim 1, wherein the DCI further comprises a second SRI, and the first SRI and the second SRI correspond to independent values of the uplink power control parameter respectively.

7. The method of claim 6, further comprising: before receiving, by the terminal device, the DCI from the network device,
receiving, by the terminal device, second configuration information from the network device, wherein the second configuration information indicates a value of the uplink power control parameter corresponding to a value of the second SRI, and the value of the uplink power control parameter corresponding to the value of the second SRI and the value of the uplink power control parameter corresponding to the value of the first SRI are independently configured by the network device.

8. The method of claim 1, wherein the uplink power control parameter comprises a path loss value for determination of the transmitting power of the uplink data or information about a downlink signal for measuring the path loss value.

9. The method of claim 1, wherein the first uplink data is part of data to be carried in the PUSCH.

10. A terminal device, comprising:
a processor;
a memory for storing instructions executable by the processor; and
an input/output interface;
the processor is configured to execute the instructions to:
receive Downlink Control Information (DCI) for scheduling a Physical Uplink Shared Channel (PUSCH) from a network device via the input/output interface, the DCI comprising a first Sounding Reference Signal (SRS) Resource Indicator (SRI);
determine, according to the DCI, a value of an uplink power control parameter corresponding to the first SRI;
determine initial transmitting power of first uplink data according to the value of the uplink power control parameter corresponding to the first SRI; and
determine an actual transmitting power of the first uplink data according to the initial transmitting power of the first uplink data, total initial transmitting power of uplink data to be carried in the PUSCH and maximum uplink transmitting power of the terminal device.

11. The terminal device of claim 10, wherein the processor is further configured to execute the instructions to:
before receiving the DCI, receive first configuration information transmitted by the network device, the first configuration information indicating a mapping relationship between a value of the first SRI and a value of the uplink power control parameter;
determine, according to a value of the first SRI in the DCI and the mapping relationship, the value of the uplink power control parameter corresponding to the first SRI.

12. The terminal device of claim 10, wherein the processor is further configured to execute the instructions to:
determine, according to the DCI, a value of a maximum transmitting power corresponding to the first SRI; and
determine, according to the value of the maximum transmitting power corresponding to the first SRI, the actual transmitting power of the first uplink data.

13. The terminal device of claim 12, wherein the processor is further configured to execute the instructions to:
determine the value of the maximum transmitting power corresponding to the first SRI according to a number of SRIs in the DCI.

14. The terminal device of claim 12, wherein the processor is further configured to execute the instructions to:
determine the value of the maximum transmitting power corresponding to the first SRI according to a number of SRS resources indicated by the first SRI in the DCI.

15. The terminal device of claim 10, wherein the DCI further comprises a second SRI, and the first SRI and the second SRI correspond to independent values of the uplink power control parameter respectively.

16. The terminal device of claim 15, wherein the processor is further configured to execute the instructions to:
before receiving the DCI, receive second configuration information transmitted by the network device, wherein the second configuration information indicates a value of the uplink power control parameter corresponding to a value of the second SRI and the value of the uplink power control parameter corresponding to the value of the second SRI and the value of the uplink power control parameter corresponding to the value of the first SRI are independently configured by the network device.

17. The terminal device of claim 10, wherein the uplink power control parameter comprises a path loss value for determination of the transmitting power of the uplink data or information about a downlink signal for measuring the path loss value.

18. The terminal device of claim 10, wherein the first uplink data is part of data to be carried in the PUSCH.

* * * * *